United States Patent [19]
Eguchi et al.

[11] 3,965,012
[45] June 22, 1976

[54] MEMBRANE SEPARATION APPARATUS

[75] Inventors: Tamiyuki Eguchi; Satoshi Imai, both of Kobe, Japan

[73] Assignee: Kanegafuchi Kagaku Kogyo Kabushiki Kaisha, Osaka, Japan

[22] Filed: Dec. 11, 1974

[21] Appl. No.: 531,476

[30] Foreign Application Priority Data
    Dec. 11, 1973  Japan.............................. 48-140901

[52] U.S. Cl............................ 210/433 M; 210/487; 210/493 M
[51] Int. Cl.²........................................ B01D 31/00
[58] Field of Search ............ 210/321, 433, 487, 493

[56] References Cited
UNITED STATES PATENTS

| | | | |
|---|---|---|---|
| 3,401,778 | 9/1968 | Hyrop............................ | 210/487 X |
| 3,442,388 | 5/1969 | Pall................................ | 210/493 X |
| 3,757,955 | 9/1973 | Leonard........................ | 210/493 X |

*Primary Examiner*—Frank A. Spear, Jr.
*Attorney, Agent, or Firm*—James C. Haight

[57] ABSTRACT

A membrane separation apparatus adapted for use in ultrafiltration is provided comprising a casing and a membrane unit enclosed therein, said membrane unit comprising a composite membrane folded flatly in zig-zag relation to form a plurality of stacked layers defining a plurality of first flow channels in alternately interleaving relation thereto, said composite membrane being made of a flexible porous support and having a pair of selectively permeable membranes on opposite outer surfaces thereof and a second flow channel therebetween.

9 Claims, 9 Drawing Figures

U.S. Patent  June 22, 1976  3,965,012
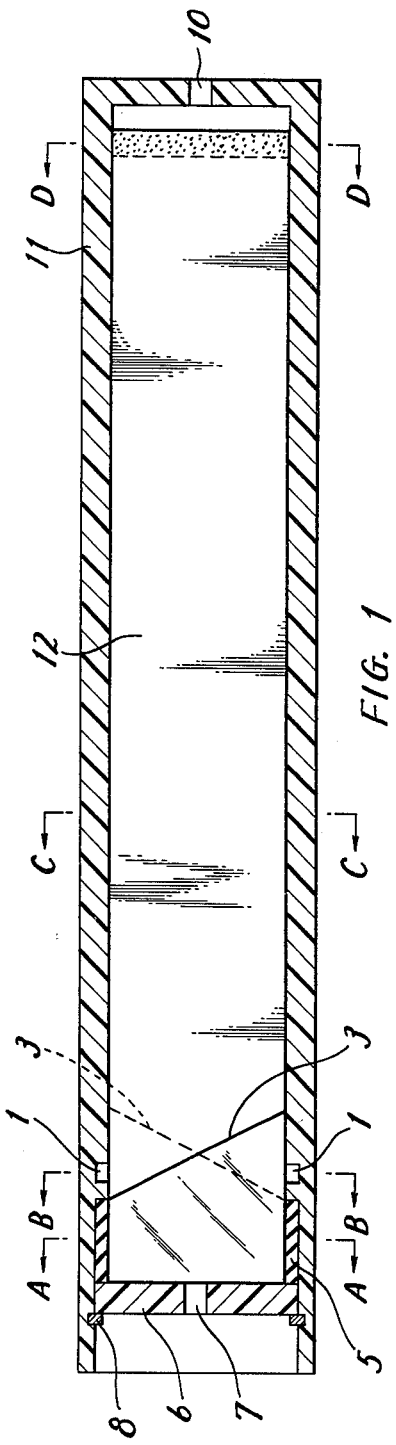
FIG. 1
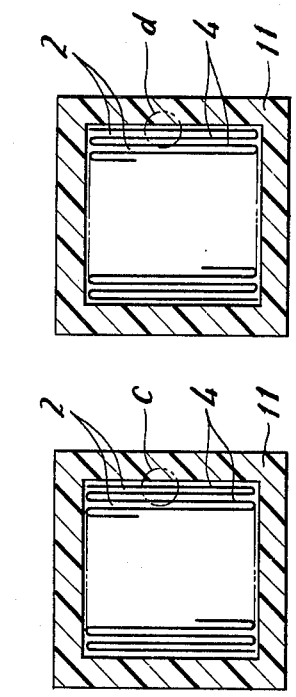
FIG. 2
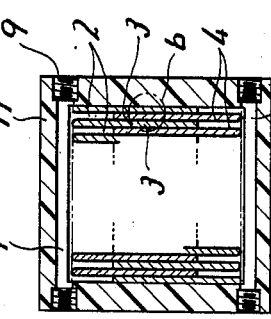
FIG. 6
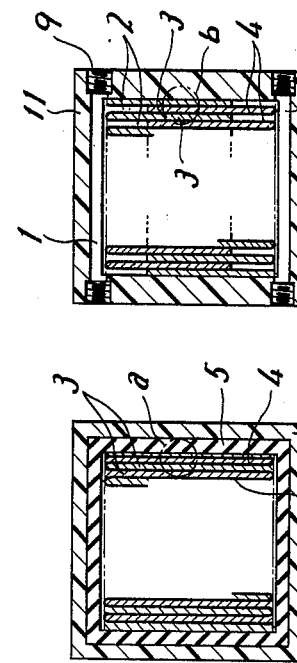
FIG. 3
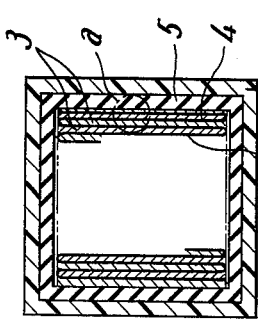
FIG. 7
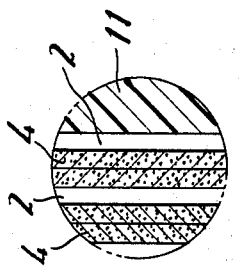
FIG. 4
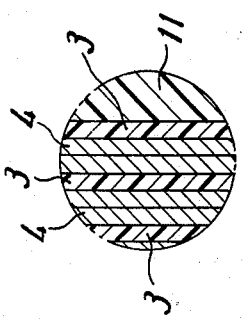
FIG. 8
FIG. 5
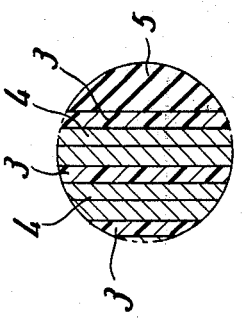
FIG. 9

MEMBRANE SEPARATION APPARATUS

This invention relates to a membrane separation apparatus. More particularly it relates to an ultrafiltration apparatus operated under relatively low pressure. The term "ultrafiltration" used herein means the operation in which solutions containing solutes such as colloidal substances, proteins and other macromolecules are filtered through a permeable membrane having a pore-size through which the solutes are restrained from passing so that the solutions are concentrated or separated.

In contrast with reverse osmosis, osmotic pressure of the solution used in ultrafiltration is so small that permeability is substantially independent from the operating pressure and, therefore, the ultrafiltration is normally carried out under a pressure of about 1 to 3 atmospheres.

Permeability of membranes used in ultrafiltration is influenced not only by the pore-size and distribution thereof but also remarkably by slime layers deposited on the membrane surface.

Particularly, the flux of permeating liquid is controlled by the thickness of the slime layer. Thus various means are necessary to perform ultrafiltration effectively, such as the use of a large Reynolds number, sophiscated construction of apparatus or the like.

When these characteristics of ultrafiltration are taken into consideration, a practically useful ultrafiltration apparatus must meet the following conditions, namely that the membrane used is excellent and easily exchangable, it has a larger effective surface area of membrane per unit volume and a thinner slime layer, etc. Since ultrafiltration is carried our under a relatively low pressure and therefore a strong pressure-durability is not required for outer casing enclosing membranes, various materials and shapes can be employed for fabrication of the casing.

Ultrafiltration apparatuses now in practical use are generally tubes made of porous materials such as fiber-reinforced plastics and have a thin membrane directly formed on inside wall of tubes.

As will be easily understood, however, said apparatuses are relatively expensive to make because said porous tubes themselves are expensive and the membrane is not replaceable. Furthermore, the effective surface area of membrane per unit volume of the apparatus of this type is not sufficiently large.

Other types of the apparatus, such as that for reverse osmosis using membrane coil disclosed in Japanese published Pat. No. 14,216/1969, or that for reverse osmosis using bundles of hollow fibers disclosed in Japanese published Patent No. 21,885/1971 have a large effective membrane area, but these constructions are generally not adapted for ultrafiltration. In these membrane coil or bundle type arrangements, a flow path for the feeding solution is provided by a mesh support convoluted between the membrane layers or by outer surfaces of the hollow fibers in the bundle, respectively, so that flow paths for feeding liquid are very narrow in these arrangements.

Therefore, flow paths may be easily plugged with slime from solutions containing slime forming substances such as colloids or other macromolecules.

According to the present invention which overcomes the foregoing defects, an apparatus having a large effective membrane surface area and replaceable membrane unit is provided.

The apparatus is hardly plugged with slime and has a simple construction without using expensive casings, such as those made of fiber-reinforced resins.

It is an object of the present invention to provide an improved ultrafiltration apparatus as described above.

According to the present invention, a membrane separation apparatus adapted for use in ultrafiltration is provided comprising a casing and a membrane unit enclosed therein, said membrane unit comprising a composite membrane folded flatly in zigzag relation to form a plurality of stacked layers defining a plurality of first flow channels in alternately interleaving relation thereto, said composite membrane being made of a flexible porous support and having a pair of selectively permeable membranes on opposite outer surfaces thereof and a second flow channel therebetween.

Composite membranes which may be employed in the present invention have a pair of selectively permeable membranes on opposite outer surfaces of a porous support such as textile fabrics, papers and the like. The porous interior of the support provides a second flow channel by itself. Composite membranes having a selectively permeable membrane layer on one side of the outer surfaces of a porous support may also be employed by overlying each other in back-to-back relation. Such composite membranes may be produced by impregnating a porous, flexible support with a non-solvent for a film-forming polymer, applying a solution of said film-forming polymer onto a surface of said support while the surface is substantially free from said nonsolvent.

The method of producing this type of composite membrane has been fully disclosed in a co-pending application by Satoshi Imai et al., Ser. No. 361,557 filed May 18, 1973 to which reference is made.

Thin semipermeable membranes may be employed in combination with a flexible porous support by simply overlying a pair of said thin membranes on the outer surfaces of the support. Care should be taken in handling these thin membranes because their mechanical strength against bursting is generally so small. Other types of selectively permeable membranes and methods for producing same have been known in the art.

Various synthetic polymeric materials such as polyvinyl chloride, dichlorodiphenylsulfone-bisphenol condensate polymer, vinyl chloride-acrylonitrile copolymer and the like have been known as materials of selectively permeable membranes. The present invention is not limited to the use of any specific type of membranes or methods of producing same but any membrane may be used provided it is adapted to use as an ultrafiltration membrane.

Since ultrafiltration requires a relatively low pressure such as 1 to 3 atmospheres as opposed to reverse osmosis, noncompressible materials may not necessarily be employed as a support but various papers or textile fabrics may preferably be used as the support to provide flow channels for liquid which has passed through the membrane Woven fabrics with filaments having a substantial thickness are particularly preferable as a support, since they are sufficiently stable in size and shape under pressures of several atmospheres and can provide sufficient flow channels.

They may be made of synthetic fibers such as nylon, polyvinyl chloride, polyester and the like, preferably polyolefins due to their noncorrosive and insoluble characteristics with treating liquids.

The invention will be further delineated in the following description taken in conjunction with the accompanying drawings wherein:

FIG. 1 is a cross-sectional view of the apparatus of this invention in parallel to layers of the membrane unit;

FIG. 2 is a cross-sectional view taken along line A—A of FIG. 1,

FIG. 3 is a cross-sectional view taken along line B—B of FIG. 1;

FIG. 4 is a cross-sectional view taken along line C—C of FIG. 1;

FIG. 5 is a cross-sectional view taken along line D—D of FIG. 1; and

FIGS. 6 through 9 are enlarged views of portions $a$, $b$, $c$ and $d$ of FIGS. 2 through 5 respectively.

Membrane unit 12 is enclosed in a rectangular casing 11 which has a port 10 near the bottom of its rear side wall and a pair of manifold means 1, 1' for distributing feeding liquid throughout the membrane unit 12. The manifold means are vertically extending grooves defined in the inside walls of side panels of casing 11 and are positioned close to but spaced from the front end of casing 11.

Manifold means 1 has an egress through top panel of casing 11 which, in turn, connects to a source of pressurized feeding liquid by means of socket 9. Front panel 6 of casing 11 is a holding means for membrane unit 12 and is adapted to be removed from the remainder of the casing by a snapping ring 8. Reference numeral 7 is a port defined near bottom of front panel 6. As will be seen in FIGS. 2 through 5, a composite membrane of the type as hereinbefore described is folded flatly in zigzag relation and the inside of casing 11 is substantially filled with the folded layers of membrane 4 across its height.

A recessed portion is provided at front end of casing 11 to receive gasket 5 which provides a seal between membrane unit 12 and inside walls of casing 11. A plurality of spacers 3 is alternately interleaved between layers of folded membrane 4 at a portion of the front end of the membrane unit nearer than manifold means 1. Spacer 3 has a beveled tail edge and is placed in such manner that said beveled edges form a cross with each other.

Consequently, a stack of spacers 3 separated by layers of composite membrane 4 defines a row of inlets for feeding liquid into the membrane unit at manifold groove 1 while spacing the remainder of layers of composite membrane 4 to provide flow channels 2 therebetween. The stack of spacers 3, layers of composite membrane 4 and its peripheral surfaces abutting gasket 5 are sealed together with a suitable sealant such as an epoxy resin.

The composite membrane is also sealed at its peripheral edges except the front edge facing front panel 6, so that the membrane unit has a serpentining opening of a flow path which is exposed to but slightly spaced from front panel 6. A pressure regulator means is attached at port 10.

Typically, a liquid is fed into the apparatus of FIG. 1 through port 9 of FIG. 3 under a pressure of about 1 to 3 atmospheres and is distributed by way of manifold means 1 along the side edge surfaces of the stacked spacer 3 and compositite membrane 4.

Then the liquid enters first flow channels 2 between layers of composite membrane 4 and proceeds therethrough toward the rear panel of casing 11. Since interior of the composite membrane communicates with the outside of the apparatus only through its serpentining opening and port 7, a pressure differential is caused between the exterior and interior of the composite membrane so that the liquid will be percolated and concentrated as the liquid proceeds through flow channels 2. The concentrated liquid is then conveyed from the apparatus by port 10.

The solvent portions of the liquid fed into the apparatus will pass through a selectively permeable membrane layer formed on opposite outer surfaces of the composite membrane into the porous interior thereof and proceeds toward outlet 7. Thus ultrafiltration is continuously effected.

Casing 11 may be made of plastics such as polyvinyl chloride and the like, or metals such as aluminum and the like.

Since ultrafiltration is usually effected at a relatively low pressure up to about 3 atmospheres, pressure-durable materials such as fiber-reinforced resins or stainless steel are not necessary to make the casing and are undesirable for economical reasons.

For the same reason, a pressure-durable configuration such as cylindrical tubes is also not needed but a rectangular configuration of casing of the present invention is sufficiently resistant to the pressure level required in ultrafiltration.

For example, a rectangular box made of polyvinyl chloride having an interior capacity of 10cm × 10cm × 30cm and a wall thickness of 1cm is resistant up to about 3.5 atmospheres.

Therefore, a large effective diffusion area per unit volume, replaceable membrane unit, prevention of plugging with slime and easiness of fabricating are more important factors for an ultrafiltration apparatus.

Meterials and configurations the casing must be decided depending upon these factors. In the apparatus herein-illustrated, the total area of inner surfaces of flow channels 2 interleaved between layers of composite membrane 4, namely the effective area of membrane, can vary with the thickness of individual stacked spacers 3.

For example, when a composite membrane having a thickness of 1mm and a width of 1m is folded in the heretofore-mentioned manner and is placed in a casing having inner capacity of 10cm × 10cm × 110cm, the effective diffusion area A of this apparatus may be calculated by the following equation:

$$A = \frac{20}{1+t} \mathrm{m}^2$$

wherein $t$ is the thickness of spacer 3 in mm. If a 1mm or 0.5mm of the thickness of spacer is chosen, the effective area A equals 10m² or about 13m² respectively. In contrast, only 3.2m² of effective area can be achieved if a plurality of cylidrical tubes having a length of 100cm and a diameter of 1cm is stacked in rows in the same casing, even when the thickness of the tube is neglected in the calculations.

Thus the apparatus of the present invention can possess an effective diffusion area several times larger than prior art apparatuses.

Nevertheless, the apparatus is substantially free from problems of plugging with slime because there is no mesh support in the flow channel for feeding liquid in contrast with coil type arrangement.

As will be seen from the foregoing equation, the effective diffusion area A increases proportionally as the thickness of spacer 3 decreases.

G. Porter et al. report in CHEM TECH, January (1971) page 56 that the thickness of slime layer formed on a membrane surface can be reduced by decreasing the width of the flow channel for feeding liquid, whereby the flux rate of permeating liquid can be increased.

In our apparatus, the width of flow channels for feeding liquid can vary with thickness of spacer. However, a preferable range of said width of flow channels as well as said thickness of spacer is from about 0.3mm to 1mm in view of possible pressure loss.

Shape of spacer 3 is not limited to that shown in FIG. 1 but can vary with the thickness thereof, kind of feeding liquid and other factors to secure uniform flow of the liquid in the flow channels 2.

Preferably it is made of plastics adapted to adhere on membrane surfaces. As already stated, stacked spacers separated by layers of composite membrane and its peripheral surfaces abutting gasket 5 are sealed together. As a sealant therefor, adhesives containing a volatile solvent are not suitable because the solvent destroys selectively permeable membranes. Suitable sealants are epoxy resins for this purpose.

The present invention is also concerned with the membrane unit of the type as described. The unit is replaceable, depending upon the nature of the feeding liquid. When slime is deposited on the walls of flow channels 2 to such extent that they cannot be washed out by flushing, the unit can be removed from the casing 1 to clean walls of the flow channels with a sponge sheet.

When a single apparatus of this invention is used, it is preferable to connect port 9 at one of a pair of manifold means 1 with a port on the other manifold means 1 by a conduit and a liquid is pumped through the remaining ports whereby the liquid may be fed uniformly from both top and bottom of manifold means, 1'.

In like manner, a plurality of the apparatus can be used in parallel, series or both depending upon the quantities of treating liquid and the degree of concentration. Thus, the apparatus of this invention is particularly useful as an ultrafiltration apparatus for concentrating solutions containing a solute such as proteins, colloidal substances or other macromolecular substances, and recovering said substances from diluted solutions thereof.

The above has been offered for illustrative purposes only, and is not intended to limit the invention of this application which is as described in the claims below.

What is claimed is:

1. A membrane separation apparatus adapted for use in ultrafiltration having a casing, a stacked membrane unit enclosed therein, a feed inlet, a concentrate outlet and an effluent outlet, said stacked membrane unit comprising:

a. a continuous composite membrane folded flatly in zigzag relation to form a plurality of stacked layers defining a plurality of outer flow channels for feed liquid in alternately interleaving pockets formed by said layers, said composite membrane being made of a flexible porous support and having a pair of selectively permeable membranes on opposite outer surfaces thereof and inner flow channels for effluent positioned between and separated from said outer flow channels by said selectively permeable membranes;

b. a plurality of spacer means alternately overlying layers of said composite membrane only along an area adjacent to one end of said composite membrane to seal between said layers of said composite membrane in said area while maintaining layers of said composite membrane in a spaced position in the other areas thereof;

c. said composite membrane being sealed at its peripheral edges except said end and defining, when folded, a serpentining opening of said inner flow channels exposing said end.

2. The membrane separation apparatus of claim 1, in which said casing comprises a rectangular box having a removable front panel defining a port near the bottom thereof, a pair of side panels each defining a manifold means extending vertically across the panel along the inside walls of said side panels close to but spaced from said front panel, and a rear panel defining a port near the bottom thereof.

3. The membrane separation apparatus of claim 2, in which said casing has an egress communicating with said manifold means.

4. The membrane separation apparatus of claim 2, in which said casing defines a recessed portion on the inside walls of the panels along said front panel extending along the edges of said front panel.

5. The membrane separation apparatus of claim 4, in which a plurality of spacer means is alternately interleaved between said layers of composite membrane at a portion of the front end of said membrane unit forward of said manifold means.

6. The membrane separation apparatus of claim 5, in which said spacer means has a beveled tail edge and is stacked alternately in interleaving relation between said layers of membrane in such a manner that its shorter side edge terminates prior to said manifold means but its longer side edge extends beyond said manifold means to form a row of ports communicating said manifold means with the remainder of said layers.

7. The membrane separation apparatus of claim 6, in which said stacked spacer means separated by said membrane layers are surrounded by a gasket at the front end thereof and said gasket is received in said recessed portion of said casing.

8. The membrane separation apparatus of claim 7, in which said stack and its peripheral surfaces abutting said gasket are sealed together.

9. The membrane separation apparatus of claim 2, in which said composite membrane is sealed at its peripheral edges except at its front edge, to expose a serpentining opening of said inner flow channels to said front panel slightly spaced therefrom.

* * * * *